United States Patent
Sano et al.

(10) Patent No.: US 11,186,674 B2
(45) Date of Patent: Nov. 30, 2021

(54) EPOXY RESIN COMPOSITION, PREPREG, FIBER-REINFORCED COMPOSITE MATERIAL, AND METHOD FOR PRODUCING SAME

(71) Applicant: Toray Industries, Inc., Tokyo (JP)

(72) Inventors: Kentaro Sano, Ehime (JP); Taiki Kuroda, Ehime (JP); Ayumi Mori, Ehime (JP); Toshiya Kamae, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 35 days.

(21) Appl. No.: 16/611,351

(22) PCT Filed: Apr. 5, 2018

(86) PCT No.: PCT/JP2018/014538
§ 371 (c)(1),
(2) Date: Nov. 6, 2019

(87) PCT Pub. No.: WO2018/207509
PCT Pub. Date: Nov. 15, 2018

(65) Prior Publication Data
US 2020/0165378 A1    May 28, 2020

(30) Foreign Application Priority Data

May 10, 2017   (JP) .............................. JP2017-093710

(51) Int. Cl.
| C08G 59/50 | (2006.01) |
| C08G 59/24 | (2006.01) |
| C08G 59/32 | (2006.01) |
| C08J 5/24  | (2006.01) |
| C08L 63/00 | (2006.01) |

(52) U.S. Cl.
CPC ....... C08G 59/5073 (2013.01); C08G 59/245 (2013.01); C08G 59/3218 (2013.01); C08J 5/24 (2013.01); C08L 63/00 (2013.01); *C08J 2363/00* (2013.01)

(58) Field of Classification Search
CPC .............. C08G 59/5073; C08G 59/245; C08G 59/3218; C08J 5/24; C08J 2363/00; C08L 63/00
USPC ....................................................... 523/468
See application file for complete search history.

(56) References Cited

U.S. PATENT DOCUMENTS

| 5,407,978 A   | * | 4/1995 | Bymark ............... C08G 59/066 |
|               |   |        | 523/457 |
| 10,227,476 B2 |   | 3/2019 | Fukuhara et al. |
| 2009/0072207 A1 | | 3/2009 | Cho et al. |
| 2012/0077401 A1 | | 3/2012 | Kotake et al. |

FOREIGN PATENT DOCUMENTS

| JP | 2001278957 A | 10/2001 | |
| JP | 2002080624 A | * 3/2002 | ............... C08J 5/24 |
| JP | 2003073456 A | * 3/2003 | ............... C08J 5/24 |
| JP | 2004063992 A | 2/2004 | |
| JP | 2008074726 A | 4/2008 | |
| JP | 2009067987 A | 4/2009 | |
| JP | 2011026559 A | 2/2011 | |
| JP | 2013064136 A | 4/2013 | |
| JP | 2013163747 A | 8/2013 | |
| JP | 2016210860 A | 12/2016 | |
| WO | 2013011677 A1 | 1/2013 | |
| WO | 2013081060 A1 | 6/2013 | |

OTHER PUBLICATIONS

Suzumura et al., JP 2003-073456 A machine translation in English, Mar. 12, 2003 (Year: 2003).*
Miyake et al., JP 2002-080624 A machine translation in English, Mar. 19, 2002 (Year: 2002).*
International Search Report and Written Opinion for Application No. PCT/JP2018/014538 dated Jul. 3, 2018, 5 pages.

* cited by examiner

*Primary Examiner* — David T Karst
(74) *Attorney, Agent, or Firm* — RatnerPrestia

(57) ABSTRACT

Provided is a fiber-reinforced composite material exhibiting high heat resistance and excellent appearance quality. is the composite material is based on an epoxy resin composition which contains constituents [A], [B], and [C] and satisfies conditions (i) and (ii):
[A] a tri- or higher functional epoxy resin;
[B] an aromatic amine;
[C] an imidazole compound;

$$0.20 \leq b/a \leq 0.60; \text{ and} \qquad (i)$$

$$0.002 \leq c/a \leq 0.014; \qquad (ii)$$

wherein a (mol) denotes the number of epoxy groups in 100 g of the epoxy resin composition, b (mol) denotes the number of active hydrogens contained in the constituent [B], and c (mol) denotes the number of imidazole rings contained in the constituent [C]).

10 Claims, No Drawings

EPOXY RESIN COMPOSITION, PREPREG, FIBER-REINFORCED COMPOSITE MATERIAL, AND METHOD FOR PRODUCING SAME

CROSS REFERENCE TO RELATED APPLICATIONS

This is the U.S. National Phase application of PCT/JP2018/014538, filed Apr. 5, 2018, which claims priority to Japanese Patent Application No. 2017-093710, filed May 10, 2017, the disclosures of these applications being incorporated herein by reference in their entireties for all purposes.

FIELD OF THE INVENTION

The present invention relates to an epoxy resin composition to be preferably used as a matrix resin for a fiber-reinforced composite material suitable for sports applications and industrial applications and a prepreg and a fiber-reinforced composite material using this epoxy resin composition as a matrix resin.

BACKGROUND OF THE INVENTION

Fiber-reinforced composite materials in which carbon fibers, aramid fibers and the like are used as reinforced fibers are widely utilized in structural materials such as aircraft and motor vehicles, sports applications such as tennis rackets, golf shafts, fishing rods, bicycles, and housings, industrial applications and the like to make use of the high specific strength and specific elastic modulus thereof. As the method for producing fiber-reinforced composite materials, a method in which a preform obtained by laminating a plurality of prepregs, which are sheet-shaped molding materials obtained by impregnating reinforced fibers with an uncured matrix resin is heated and cured under pressure, a resin transfer molding method in which a liquid resin is poured into the reinforced fibers disposed in a mold and heated and cured, and the like are used.

Among these production methods, the method using a prepreg has an advantage that a high-performance fiber-reinforced composite material is likely to be obtained since the orientation of reinforced fibers can be strictly controlled and the design freedom of laminate configuration is high. As the matrix resin to be used in this prepreg, thermosetting resins are mainly used from the viewpoint of heat resistance and productivity, and, among these, epoxy resins are preferably used from the viewpoint of mechanical property such as adhesiveness to reinforced fibers. In recent years, fiber-reinforced composite materials have been used as substitute materials for metals in order to further save the weights of members and demanded to exhibit extremely high heat resistance.

In order to obtain a fiber-reinforced composite material exhibiting high heat resistance, it is generally required to cure the matrix resin at a high temperature. However, in the method using prepregs, when the preform is exposed to a high temperature by a sudden increase in temperature, the viscosity of the matrix resin decreases, the resin flows out from the preform, and the resin withering occurs on the surface of the fiber-reinforced composite material to deteriorate the appearance quality. Hence, in order to achieve both the appearance quality and heat resistance of fiber-reinforced composite material, a molding method in which primary curing at a low temperature for increasing the viscosity of the resin and secondary curing at a high temperature for enhancing the heat resistance are combined is used in some cases. In this molding method, the low-temperature curability of the resin in the primary curing affects the appearance quality of the fiber-reinforced composite material and the resin flow increases when the curing is slow, and thus resin withering occurs on the surface of the fiber-reinforced composite material or fiber orientation is disturbed. On the other hand, the resin flow decreases when curing is fast, and thus pits are generated on the surface of the fiber-reinforced composite material. In order to diminish the poor appearance quality of fiber-reinforced composite materials, it is required to impart proper low-temperature curability to the matrix resin.

As an epoxy resin composition for fiber-reinforced composite material, which is equipped with low-temperature curability and provides a cured product exhibiting heat resistance, Patent Document 1 discloses a method in which a specific imidazole is used as a curing agent and Patent Document 2 discloses a method in which an aromatic amine and a boron trifluoride amine complex are concurrently used as a curing agent.

PATENT DOCUMENTS

Patent Document 1: International Publication No. 2013/081060
Patent Document 2: Japanese Patent Laid-open Publication No. 2016-210860

SUMMARY OF THE INVENTION

However, the epoxy resin compositions described in Patent Document 1 and Patent Document 2 do not satisfy the heat resistance recently required although both of these exhibit excellent low-temperature curability.

An object of the present invention is to ameliorate the disadvantages of the prior arts and thus to provide an epoxy resin composition which is equipped with proper low-temperature curability and provides a cured product exhibiting high heat resistance, a prepreg using the epoxy resin composition, and a fiber-reinforced composite material which is obtained by curing the prepreg and has an excellent appearance.

The present inventors have conducted intensive investigations to solve the above-mentioned problems, as a result, found out an epoxy resin composition having the following configuration, and thus completed the present invention. In other words, the present invention consists of the following configuration.

An epoxy resin composition containing constituents [A], [B], and [C] below, and satisfying conditions (i) and (ii):
[A] a tri- or higher functional epoxy resin
[B] an aromatic amine
[C] an imidazole compound $$0.20 \leq b/a \leq 0.60 \quad \text{(i)}$$

$$0.002 \leq c/a \leq 0.014 \quad \text{(ii)}$$

(where, a (mol) denotes a number of epoxy groups in 100 g of entire of the epoxy resin composition, b (mol) denotes a number of active hydrogen contained in the constituent [B], and c (mol) denotes a number of imidazole rings contained in the constituent [C]).

Moreover, a prepreg of the present invention includes the epoxy resin composition and a reinforced fiber. Furthermore, a fiber-reinforced composite material of the present invention includes the prepreg being cured.

According to the present invention, it is possible to provide an epoxy resin composition which is equipped with proper low-temperature curability and provides a cured product exhibiting high heat resistance, a prepreg using the epoxy resin composition, and a fiber-reinforced composite material which is obtained by curing the prepreg and has an excellent appearance.

DETAILED DESCRIPTION OF EMBODIMENTS OF THE INVENTION

The epoxy resin composition of the present invention contains [A] a tri- or higher functional epoxy resin, [B] an aromatic amine, and [C] an imidazole compound as essential constituents.

<Constituent [A]>

The constituent [A] to be used in the present invention is a tri- or higher functional epoxy resin and is a compound having three or more epoxy groups in one molecule. The amount of the tri- or higher functional epoxy resin blended is preferably 60 to 100 parts by mass and still more preferably 80 to 100 parts by mass in 100 parts by mass of all epoxy resins. A cured resin exhibiting high heat resistance tends to be obtained in a case in which this range is satisfied.

Examples of the tri- or higher functional epoxy resin include a glycidyl amine epoxy resin and a glycidyl ether epoxy resin.

Examples of the tri- or higher functional glycidyl amine epoxy resin include a diaminodiphenylmethane epoxy resin, a diaminodiphenyl sulfone epoxy resin, an aminophenol epoxy resin, a metaxylenediamine epoxy resin, a 1,3-bisaminomethylcyclohexane epoxy resin, and an isocyanuric acid epoxy resin. Among these, a diaminodiphenylmethane epoxy resin and an aminophenol epoxy resin are particularly preferably used because of a favorable balance of physical properties.

In addition, examples of the tri- or higher functional glycidyl ether epoxy resin include a phenol novolac epoxy resin, an orthocresol novolac epoxy resin, a tris(hydroxyphenyl)methane epoxy resin, a tetrakis(hydroxyphenyl)ethane epoxy resin, and a naphthalene epoxy resin.

Examples of commercially available products of the tri- or higher functional epoxy resin include ELM434 (manufactured by Sumitomo Chemical Co., Ltd.), "Araldite (registered trademark)" MY 720, "Araldite (registered trademark)" MY 721, "Araldite (registered trademark)" MY 9512, and "Araldite (registered trademark)" MY 9663 (all manufactured by Huntsman Advanced Materials LLC.), and "Epotohto (registered trademark)" YH-434 (manufactured by NIPPON STEEL Chemical & Material Co., Ltd.) as a diaminodiphenylmethane epoxy resin.

Examples of commercially available products of a metaxylenediamine epoxy resin include TETRAD-X (manufactured by MITSUBISHI GAS CHEMICAL COMPANY).

Examples of commercially available products of a 1,3-bisaminomethylcyclohexane epoxy resin include TETRAD-C (manufactured by MITSUBISHI GAS CHEMICAL COMPANY).

Examples of commercially available products of an isocyanurate epoxy resin include "TEPIC (registered trademark)"-S (manufactured by Nissan Chemical Corporation).

Examples of commercially available products of a tris (hydroxyphenyl)methane epoxy resin include Tactix 742 (manufactured by Huntsman Advanced Materials LLC.) and "jER (registered trademark)" 1032H60 (manufactured by Mitsubishi Chemical Corporation).

Examples of commercially available products of a tetrakis (hydroxyphenyl)ethane epoxy resin include TEP-G (manufactured by ASAHI YUKIZAI CORPORATION) and "jER (registered trademark)" 1031S (Mitsubishi Chemical Corporation).

Examples of commercially available products of an aminophenol epoxy resin include ELM120 and ELM100 (manufactured by Sumitomo Chemical Co., Ltd.), "jER (registered trademark)" 630 (manufactured by Mitsubishi Chemical Corporation), "Araldite (registered trademark)" MY 0510 (manufactured by Huntsman Advanced Materials LLC.), "Araldite (registered trademark)" MY 0600 (manufactured by Huntsman Advanced Materials LLC.), and "Araldite (registered trademark)" MY 0610 (Huntsman Advanced Materials LLC.).

Examples of commercially available products of a phenol novolac epoxy resin include DEN431 and DEN438 (all manufactured by The Dow Chemical Company) and "jER (registered trademark)" 152 (manufactured by Mitsubishi Chemical Corporation).

Examples of commercially available products of an orthocresol novolac epoxy resin include EOCN-1020 (manufactured by Nippon Kayaku Co., Ltd.) and "EPICLON (registered trademark)" N-660 (manufactured by DIC Corporation).

Examples of commercially available products of a dicyclopentadiene epoxy resin include "EPICLON (registered trademark)" HP7200 (manufactured by DIC Corporation).

In the present invention, it is preferable to contain [A1] a tetrakis(hydroxyphenyl)ethane epoxy resin as the constituent [A]. The heat resistance of the cured resin tends to be further enhanced as [A1] is contained. [A1] contains a compound represented by Formula (I) as a main component. Here, the main component means a component contained in [A1] at the highest content.

[Chem. 1]

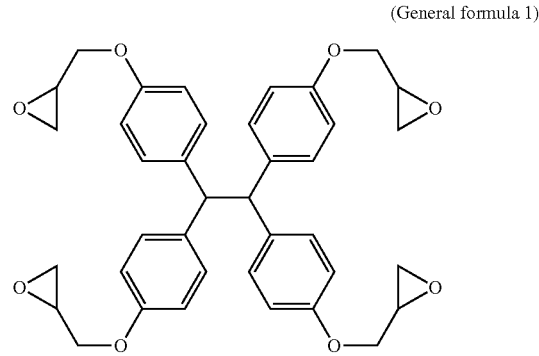

(General formula 1)

Examples of commercially available products of [A1] include TEP-G (manufactured by ASAHI YUKIZAI CORPORATION) and "jER (registered trademark)" 1031S (Mitsubishi Chemical Corporation). The amount of [A1] blended is preferably 10 to 50 parts by mass and still more preferably 20 to 40 parts by mass in 100 parts by mass of all epoxy resins. By setting the amount of [A1] blended to be in this range, the heat resistance and appearance quality of the fiber-reinforced composite material can be compatible at a high level. The heat resistance may be slightly diminished in a case in which the amount of [A1] blended is less than 10 parts by mass, and the resin flow during the primary curing may decreases since the viscosity of the resin is high or pits may be generated on the surface of the fiber-reinforced composite material, and the appearance quality may be slightly diminished in a case in which the amount of [A1] blended exceeds 50 parts by mass.

Incidentally, epoxy resins other than the constituent, [A] can be blended in the epoxy resin composition of the present invention. Examples of the epoxy resins other than the constituent [A] include a bisphenol A epoxy resin, a bisphenol F epoxy resin, a bisphenol S epoxy resin, a biphenyl epoxy resin, a naphthalene epoxy resin, an epoxy resin having a fluorene skeleton, a diglycidyl resorcinol, a glycidyl ether epoxy resin, and a N,N-diglycidyl aniline. As the epoxy resin, these may be used singly or in combination of plural kinds thereof.

<Constituent [B]>

The constituent [B] to be used in the present invention is an aromatic amine and is preferably blended as a curing agent of the epoxy resin in order to enhance the heat resistance of the cured resin to be obtained. Examples of [B] the aromatic amine include 4,4'-diaminodiphenylmethane, 4,4'-diaminodiphenyl sulfone, 3,3'-diaminodiphenyl sulfone, m-phenylenediamine, m-xylylenediamine, and diethyltoluenediamine. Among these, 4,4'-diaminodiphenyl sulfone and 3,3'-diaminodiphenyl sulfone are suitably used because of excellent heat resistance thereof.

Examples of commercially available products of 4,4'-diaminodiphenyl sulfone include "SEIKACURE (registered trademark)"-S (manufactured by SEIKA CORPORATION). Examples of commercially available products of 3,3'-diaminodiphenyl sulfone include 3,3'-DAS (manufactured by MITSUI FINE CHEMICALS, INC.).

<Constituent [C]>

The constituent [C] to be used in the present invention is an imidazole compound and is preferably blended as a curing agent of the epoxy resin in order to impart low-temperature curability to the epoxy resin. When another curing agent is concurrently used with [B] the aromatic amine, the heat resistance of the cured resin may be greatly diminished as compared to the case of using [B] the aromatic amine singly. However, in a case in which [B] the aromatic amine is concurrently used with [C] the imidazole compound, a decrease in heat resistance of the cured resin can be suppressed and a resin composition having an excellent balance between the low-temperature curability and the heat resistance of the cured resin can be obtained.

Examples of [C] the imidazole compound include 1-benzyl-2-methylimidazole, 1-benzyl-2-ethylimidazole, 1-cyanoethyl-2-methylimidazole, 1-cyanoethyl-2-ethyl-4-methylimidazole, 1-cyanoethyl-2-phenylimidazole, and 2-phenyl-4-methyl-5-hydroxymethylimidazole. The imidazole compound may be used singly or in combination of plural kinds thereof.

Furthermore, the imidazole compound preferably contains a reaction product of [C1] an imidazole compound and a bisphenol epoxy resin. The balance between the low-temperature curability and the heat resistance of the cured resin can be improved as [C1] is used. Examples of commercially available products of [C1] include "CUREDUCT (registered trademark)" P-0505 (SHIKOKU CHEMICALS CORPORATION) and "jER Cure (registered trademark)" P200H50 (Mitsubishi Chemical Corporation).

<Conditions (i) and (ii)>

The epoxy resin composition of the present invention is required to satisfy conditions (i) and (ii) when the number of epoxy groups in 100 g of entire of the epoxy resin composition is denoted as a (mol), the number of active hydrogen contained in [B] is denoted as b (mol), and the number of imidazole rings contained in [C] is denoted as c (mol).

$$0.20 \leq b/a \leq 0.60 \quad \text{(i)}$$

$$0.002 \leq c/a \leq 0.014 \quad \text{(ii)}$$

(where, a (mol) denotes a number of epoxy groups in 100 g of entire of the epoxy resin composition, b (mol) denotes a number of active hydrogen contained in the constituent [B], and c (mol) denotes a number of imidazole rings contained in the constituent [C]).

The values of a, b, and c above can be calculated as follows, respectively.

(Method for Calculating Value of a)

The mass fraction of the epoxy resin component in entire of the epoxy resin composition is denoted as $W_a$. In D parts by mass of epoxy resin component composed of n kinds of epoxy resins, when an epoxy resin with an epoxy equivalent weight of $E_x$ (g/eq) is blended by $F_x$ parts by mass, the value of a can be calculated by Equation 1 (where x=1, 2, 3, ..., n).

[Math. 1]

$$a = \frac{100 \times W_a \times \left\{\left(\frac{F_1}{E_1}\right) + \left(\frac{F_2}{E_2}\right) \ldots + \left(\frac{F_x}{E_x}\right) \ldots + \left(\frac{F_n}{E_n}\right)\right\}}{D} \quad \text{(Equation 1)}$$

(Method for Calculating Value of b)

When the mass fraction of [B] the aromatic amine in entire of the epoxy resin composition is denoted as $W_b$ and the active hydrogen equivalent is denoted as G (g/eq), the value of b can be calculated by Equation 2.

[Math. 2]

$$b = \frac{100 \times W_b}{G} \quad \text{(Equation 2)}$$

(Method for Calculating Value of c)

When the mass fraction of [C] the imidazole compound in entire of the epoxy resin composition is denoted as $W_c$ and the imidazole equivalent is denoted as H (g/eq), the value of c can be calculated by Equation 3.

[Math. 3]

$$c = \frac{100 \times W_c}{H} \quad \text{(Equation 3)}$$

With regard to the condition (i), b/a is required to be 0.20 to 0.60 and is preferably 0.30 to 0.50. A cured epoxy resin exhibiting excellent heat resistance is obtained in a case in which this range is satisfied. In general, in the epoxy resin composition in which [B] the aromatic amine is used as a curing agent, the active hydrogen of the aromatic amine and the epoxy group of the epoxy resin react with each other at a ratio of 1:1 and thus b/a is often set to 0.90 to 1.10. However, in the present invention, an aromatic amine and [C] the imidazole compound are concurrently used as a curing agent and it is thus important to set b/a to be in the range of condition (i). By setting b/a to be in the range of condition (i), particularly the heat resistance of the cured resin is enhanced in the case of performing secondary curing at 210° C. to 270° C.

With regard to condition (ii), c/a is required to be 0.002 to 0.014 and is preferably 0.003 to 0.012 and more preferably 0.004 to 0.010. In a case in which this range is satisfied, the epoxy resin composition exhibits proper low-temperature curability and the appearance quality is favorable when the epoxy resin composition is used as a matrix resin for a fiber-reinforced composite material. When c/a is less than 0.002, the low-temperature curability is insufficient and the resin flow increases during the primary curing or resin withering and disturbance of fiber orientation on the surface of the fiber-reinforced composite material occur and the appearance quality is diminished. Moreover, the amount of curing agent with respect to the amount of epoxy resin is insufficient, thus curing incompletely proceeds and the heat resistance is diminished. When c/a exceeds 0.014, the curing is too fast at the time of the primary curing, and the resin flow decreases, thus pits are generated on the surface of the fiber-reinforced composite material, and the appearance quality is diminished. In addition, the amount of the curing agent with respect to the amount of epoxy resin is too large, thus curing incompletely proceeds and the heat resistance is slightly diminished.

a is preferably 0.30 to 1.00, more preferably 0.40 to 0.90, and still more preferably 0.50 to 0.80. A cured epoxy resin exhibiting excellent heat resistance tends to be obtained in a case in which this range is satisfied.

<Minimum Viscosity of Epoxy Resin Composition>

With regard to the viscosity property of the epoxy resin composition of the present invention, the minimum viscosity is preferably in a range of 0.1 to 4.0 Pa·s and more preferably in a range of 0.3 to 3.5 Pa·s when the viscosity is measured at a temperature raising rate of 1.5° C./min. Here, the minimum viscosity is a value attained by setting the epoxy resin composition so that the distance between the upper and lower jigs is 1 mm and then measuring the viscosity at a temperature raising rate of 1.5° C./min in a measurement temperature range of 40° C. to 160° C. in a torsion mode (measurement frequency: 0.5 Hz) using a dynamic viscoelasticity apparatus ARES-2KFRTN1-FCO-STD (manufactured by TA Instruments) and a flat parallel plate with a diameter of 40 mm as the upper and lower measurement jigs.

As the minimum viscosity satisfies the above range, the flow amount of the resin during the primary curing is optimized and the fiber-reinforced composite material of the present invention exhibiting superior appearance quality is obtained.

<Thermoplastic Resin>

In the epoxy resin composition of the present invention, a thermoplastic resin can be blended as long as the effects of the present invention are not lost. As the thermoplastic resin, a thermoplastic resin soluble in the epoxy resin, organic, particles such as rubber particles and thermoplastic resin particles, and the like can be blended.

Examples of the thermoplastic resin soluble in the epoxy resin include polyvinyl acetal resins such as polyvinyl formal and polyvinyl butyral, polyvinyl alcohol, a phenoxy resin, polyamide, polyimide, polyvinyl pyrrolidone, and polysulfone.

Examples of the rubber particles include crosslinked rubber particles and core shell rubber particles obtained by graft polymerization of different polymers on the surface of the crosslinked rubber particles.

<Method for Preparing Epoxy Resin Composition>

For the preparation of the epoxy resin composition of the present invention, for example, a kneader, a planetary mixer, a triple roll mil, and a twin screw extruder may be used for kneading or kneading may be performed by hand using a beaker and a spatula as long as uniform kneading is possible.

<Configuration of Fiber-Reinforced Composite Material>

Next, the fiber-reinforced composite material will be described. A fiber-reinforced composite material containing a cured product of the epoxy resin composition of the present invention as a matrix resin can be obtained by combining and integrating the epoxy resin composition of the present invention with reinforced fibers and then heating and curing the mixture.

It is preferable that the glass transition temperature of a cured resin obtained by subjecting the epoxy resin composition of the present invention to primary curing at 180° C. for 30 minutes and then to secondary curing at 240° C. for 30 minutes is 220° C. or more. The fiber-reinforced composite material exhibiting high heat resistance of the present invention is obtained as an epoxy resin composition of which the cured resin has a glass transition temperature of 220° C. or more.

Here, the glass transition temperature is an onset temperature of the storage elastic modulus when the temperature is raised from 40° C. to 350° C. at a temperature raising rate of 5° C./min and the storage elastic modulus is measured in a bending mode at a frequency of 1.0 Hz using a dynamic viscoelasticity measuring apparatus (DMAQ800: manufactured by TA Instruments).

The reinforced fibers to be used in the fiber-reinforced composite material of the present invention is not particularly limited, and a glass fiber, a carbon fiber, an aramid fiber, a boron fiber, an alumina fiber, a silicon carbide fiber and the like are used. These fibers may be used singly or in combination of two or more kinds thereof. Among these, it is preferable to use a carbon fiber from the viewpoint of obtaining a lightweight and highly elastic fiber-reinforced composite material.

<Prepreg>

When obtaining a fiber-reinforced composite material, it is preferable to produce a prepreg composed of an epoxy resin composition and reinforced fibers in advance. The prepreg is a material form in which the fiber disposition and the resin proportion can be precisely controlled and the property of the composite material can be maximized. The prepreg can be obtained by impregnating a reinforced fiber substrate with the epoxy resin composition of the present invention. Examples of the impregnation method include known methods such as hot-melt process (dry method).

The hot-melt process is a method in which a reinforced fiber is directly impregnated with an epoxy resin composition of which the viscosity is decreased by heating. Specifically, the hot-melt process is a method in which a film is produced by coating a release paper or the like with an epoxy resin composition, subsequently the film is stacked from both sides or one side of a sheet obtained by arranging reinforced fibers or a knitted fabric (cloth) of reinforced fibers, and heat and pressure is applied to the stacked body to impregnate the reinforced fibers with the resin.

<Method for Producing Fiber-Reinforced Composite Material>

In the prepreg laminate molding method which is one of the methods for producing a fiber-reinforced composite material, as a method for applying heat and pressure, a press molding method, an autoclave molding method, a bag molding method, a wrapping tape method, an internal pressure molding method and the like can be appropriately used.

In the production of the fiber-reinforced composite material of the present invention, it is preferable that the prepreg laminate is disposed in a mold and subjected to primary curing at a low temperature, then removed from the mold, and subjected to secondary curing at a high temperature. By properly thickening the resin by the primary curing, resin flow can be suppressed and resin withering on the surface of the fiber-reinforced composite material can be prevented.

In the primary curing, it is preferable that the temperature and time are set to be as follows.

It is preferable to set the primary curing temperature to 130° C. to 200° C. When the primary curing temperature is 130° C. or more, the epoxy resin composition of the present invention can sufficiently undergo the curing reaction and a fiber-reinforced composite material can be obtained with high productivity. When the primary curing temperature is 200° C. or less, a decrease in the viscosity of the resin due to an increase in temperature is small, resin withering on the surface of the fiber-reinforced composite material due to resin flow can be suppressed, and a fiber-reinforced composite material exhibiting excellent appearance quality is likely to be obtained. The primary curing temperature is set to more preferably 150° C. to 190° C. and most preferably 160° C. to 185° C. from the viewpoint of productivity and appearance quality.

It is preferable to set the primary curing time to 15 to 120 minutes. The epoxy resin composition of the present invention can sufficiently undergoes the curing reaction as the primary curing time is set to 15 minutes or more, and the mold occupancy time can be shortened and a fiber-reinforced composite material can be obtained with high productivity as the primary curing time is set to 120 minutes or less.

In secondary curing, it is preferable that the temperature and time are set to be as follows.

It is preferable that the secondary curing temperature is set to 210° C. to 270° C. A fiber-reinforced composite material exhibiting high heat resistance can be obtained as curing is performed at the above temperature. A fiber-reinforced composite material exhibiting excellent heat resistance is obtained when the secondary curing temperature is 210° C. or more. When the secondary curing temperature is 270° C. or less, the epoxy resin composition is not decomposed by heat and a fiber-reinforced composite material exhibiting excellent heat resistance and excellent strength is obtained. In addition, the heating temperature is set to more preferably 220° C. to 255° C. and still more preferably 230° C. to 250° C. from the viewpoint of heat resistance. The secondary curing time is preferably 10 minutes or more and more preferably 20 minutes or more in order to obtain a fiber-reinforced composite material exhibiting excellent heat resistance.

<Application of Fiber-Reinforced Composite Material>

A fiber-reinforced composite material containing a cured product of the epoxy resin composition of the present invention and a reinforced fiber can be widely used in industrial applications and sports applications. More, specifically, in industrial applications, the fiber-reinforced composite material is suitably used in structures such as motor vehicles, aircraft, ships, and railway vehicles, and the like. In sports applications, the fiber-reinforced composite material is suitably used in applications of golf shafts, fishing rods, bicycles, and tennis and badminton rackets. Among these, the fiber-reinforced composite material is particularly suitably utilized in industrial material applications to be used in a high temperature environment to make use of the feature that a fiber-reinforced composite material exhibiting high heat resistance is obtained.

EXAMPLES

Hereinafter, the present invention will be described more specifically with reference to Examples, but the present invention is not limited to the description of these Examples. The measurement of various physical properties was performed in an environment at a temperature of 23° C. and a relative humidity of 50% unless otherwise stated. The materials used to mold the respective fiber-reinforced composite materials are as follows.

<Materials Used>

Constituent [A]: Tri- or Higher Functional Epoxy Resin
  "SUMI-EPOXY (registered trademark)" ELM434 (diaminodiphenylmethane epoxy resin, epoxy equivalent weight: 120 g/eq, manufactured by Sumitomo Chemical Co., Ltd.).
  "SUMI-EPOXY (registered trademark)" ELM100 (aminophenol epoxy resin, epoxy equivalent weight: 107 g/eq, manufactured by Sumitomo Chemical Co., Ltd.).
  "jER (registered trademark)" 1032H60 (tris(hydroxyphenyl)methane epoxy resin, epoxy equivalent weight: 169 g/eq, manufactured by Mitsubishi Chemical Corporation).

Constituent [A1]: Tetrakis(Hydroxyphenyl)Ethane Epoxy Resin
  "jER (registered trademark)" 1031S (tetrakis(hydroxyphenyl)ethane epoxy resin, epoxy equivalent weight: 200 g/eq, manufactured by Mitsubishi Chemical Corporation).

Epoxy Resin Other than Constituent [A]
  "jER (registered trademark)" 828 (bisphenol A epoxy resin, epoxy equivalent weight: 189 g/eq, manufactured by Mitsubishi Chemical Corporation).

Constituent [B]: Aromatic Amine
  "SEIKACURE (registered trademark)"-S (4,4'-diaminodiphenyl sulfone, active hydrogen equivalent: 62 g/eq, manufactured by SEIKA CORPORATION).

Constituent [C]: Imidazole Compound
  "CUREZOL (registered trademark)" 2P4MHZ (2-phenyl-4-methyl-5-hydroxymethylimidazole, imidazole equivalent: 188 g/eq, manufactured by SHIKOKU CHEMICALS CORPORATION).
  "NOVACURE (registered trademark)" HX3722 (micro capsule imidazole compound, imidazole equivalent: 720 g/eq, manufactured by Asahi Kasei Corporation).

Constituent [C1]: Reaction Product of Imidazole Compound and Bisphenol Epoxy Resin
  "CUREZOL (registered trademark)" P-0505 (adduct of bisphenol A diglycidyl ether and imidazole, imidazole equivalent: 280 g/eq, manufactured by SHIKOKU CHEMICALS CORPORATION).

Curing Agent Other than Constituents [B] and [C]
  "jER Cure (registered trademark)" DICY7 (dicyandiamide, manufactured by Mitsubishi Chemical Corporation).
  DCMU99 (3-(3,4-dichlorophenyl)-1,1-dimethylurea, manufactured by Hodogaya Chemical Co., Ltd.).

Thermoplastic Resin
  "SUMIKA EXCEL (registered trademark)" PES 5003P (polyethersulfone, manufactured by Sumitomo Chemical Co., Ltd.)

<Method for Preparing Epoxy Resin Composition>

An epoxy resin and a thermoplastic resin were put into a kneader. While kneading these, the temperature was raised to 150° C. and then kept at the same temperature for 1 hour to obtain a transparent viscous liquid. The temperature was lowered to 60° C. while continuously performing kneading, and then the curing agent was added to the liquid, and the mixture was kneaded for 30 minutes at the same temperature to obtain an epoxy resin composition. The compositions of the epoxy resin compositions of the respective Examples and Comparative Examples are presented in Tables 1 to 3.

<Method for Producing Cured Epoxy Resin>

An epoxy resin composition prepared in conformity with the <method for preparing epoxy resin composition> described above was degassed in a vacuum, then subjected to primary curing at 180° C. for 30 minutes in a mold set so as to have a thickness of 2 mm by a 2 mm thick "Teflon (registered trademark)" spacer, and then subjected to secondary curing at 240° C. for 30 minutes to obtain a plate-shaped cured epoxy resin having a thickness of 2 mm. Thereafter, the cured epoxy resin obtained was heated in an oven heated to 240° C. for 30 minutes.

<Method for Producing Prepreg>

An epoxy resin composition prepared in conformity with the <method for preparing epoxy resin composition> described above was applied onto release paper using a film coater to produce a resin film having a basis weight of 31 g/m$^2$. The resin film produced was set in a prepregging apparatus and heat and pressure was applied thereto to impregnate carbon fibers "Torayca (registered trademark)" T700S (manufactured by Toray Industries, Inc., basis weight 125 g/m$^2$) arranged in one direction to form a sheet with the resin from both sides of the carbon fibers. The resin content in the prepreg was 67% by mass.

<Method for Producing Fiber-Reinforced Composite Material>

The fiber directions of the unidirectional prepreg obtained in the <method for producing prepreg> described above were arranged in order to obtain a prepreg laminate in which 19 sheets were laminated. The prepreg laminate and a 2 mm thick metal spacer were disposed on the lower mold of the mold, the upper mold was lowered, and the mold was tightened. While applying pressure to the mold with respect to the prepreg laminate, the temperature was raised to 180° C. at a temperature raising rate of 5° C./min and held for 60 minutes to primarily cure the prepreg laminate. Next, the molded article was taken out from the mold and then held in a hot air oven heated to 240° C. for 30 minutes to be secondarily cured, thereby obtaining a flat fiber-reinforced composite material.

<Method for Measuring Minimum Viscosity of Epoxy Resin Composition>

Here, the viscosity of an epoxy resin composition obtained by the <method for preparing epoxy resin composition> described above was measured at a temperature raising rate of 1.5° C./min in a measurement temperature range of 40° C. to 140° C. in a torsion mode (measurement frequency: 0.5 Hz) after setting the epoxy resin composition so that the distance between the upper and lower jigs was 1 mm using a dynamic viscoelasticity apparatus ARES-2KFRTN1-FCO-STD (manufactured by TA Instruments) and a flat parallel plate with a diameter of 40 mm as the upper and lower measurement jigs.

<Method for Measuring Glass Transition Temperature of Cured Epoxy Resin>

A test piece having a width of 10 mm, a length of 40 mm, and a thickness of 2 mm was cut out from a cured epoxy resin produced in conformity with the <method for producing cured epoxy resin> described above, the deformation mode was set to cantilevered bending, the span was set to 18 mm, the strain was set to 20 μm, the frequency was set to 1 Hz, and the measurement was performed under the condition of constant temperature increase of 5° C./min from 40° C. to 350° C. using a dynamic viscoelasticity measuring apparatus (DMA-Q800: manufactured by TA Instruments). The onset temperature of the storage elastic modulus in the storage elastic modulus-temperature curve attained was taken as the glass transition temperature (Tg).

<Method for Evaluating Appearance Quality of Fiber-Reinforced Composite Material>

The appearance quality of the surface of a fiber-reinforced composite material produced in conformity with the <method for producing fiber-reinforced composite material> described above was visually evaluated based on the presence or absence of defects such as resin withering, disturbance of fiber orientation, and pits. Those not having defects were judged as "A", those having some defects at a level having no problem were judged as "B", and those having a number of defects and poor appearance were judged as "C".

Example 1

An epoxy resin composition was prepared in conformity with the <method for preparing epoxy resin composition> described above using 100 parts by mass of "SUMI-EPDXY (registered trademark)" ELM434 as the constituent [A], 20.7 parts by mass of "SEIKACURE (registered trademark)"-S as the constituent [B], and 1.0 part by mass of "CUREZOL (registered trademark)" 2P4MHZ as the constituent [C]. The value of b/a in this epoxy resin composition was 0.40 and the value of c/a therein was 0.006.

A cured epoxy resin of this epoxy resin composition was produced in conformity with the <method for producing cured epoxy resin> described above, the glass transition temperature (Tg) thereof was measured in conformity with the <method for measuring glass transition temperature of cured epoxy resin> described above, and Tg was 232° C. to be high. In addition, a fiber-reinforced composite material was produced in conformity with the <method for producing fiber-reinforced composite material> described above, the appearance quality was evaluated in conformity with the <method for evaluating appearance quality of fiber-reinforced composite material> described above, and the result was A as the fiber-reinforced composite material exhibited favorable appearance quality without any defect.

Examples 2 to 5 and 7 to 13

Epoxy resin compositions, cured epoxy resins, and fiber-reinforced composite materials were produced by the same methods as in Example 1 except that the resin composition was changed as presented in Tables 1, 2, and 3, respectively. For the respective Examples, the Tg of the cured epoxy resins and the appearance quality of the fiber-reinforced composite materials were as presented in Tables 1 and 2 to be all favorable.

Example 6

An epoxy resin composition, a cured epoxy resin, and a fiber-reinforced composite material were produced by the same methods as in Example 1 except that the resin composition was changed as presented in Table 1. In the present composition, the amount of constituent [A1] was 60 parts to be large, and thus the Tg of the cured resin was 270° C. to be extremely high. Meanwhile, the minimum viscosity of the resin was high, thus pits were slightly observed in the fiber-reinforced composite material at a level having no problem, and the appearance quality was B.

Example 14

An epoxy resin composition, a cured epoxy resin, and a fiber-reinforced composite material were produced by the same methods as in Example 1 except that the resin composition was changed as presented in Table 2. The Tg of the cured resin was 226° C. to be high. Meanwhile, in the present composition, the value of c/a was 0.003 to be small, thus resin withering was slightly observed on the surface of the fiber-reinforced composite material at a level having no problem, and the appearance quality was B.

Example 15

An epoxy resin composition, a cured epoxy resin, and a fiber-reinforced composite material were produced by the same methods as in Example 1 except that the resin composition was changed as presented in Table 2. The Tg of the cured resin was 227° C. to be high. Meanwhile, in the present composition, the value of c/a was 0.013 to be great, thus pits were slightly observed on the surface of the fiber-reinforced composite material at a level having no problem, and the appearance quality was B.

Comparative Example 1

An epoxy resin composition, a cured epoxy resin, and a fiber-reinforced composite material were produced by the same methods as in Example 1 except that the resin composition was changed as presented in Table 3. In the present composition, the constituent [B] was not contained as a curing agent but dicyandiamide was used instead of the constituent [B], and thus the Tg of the cured resin was 207° C. to be low. Meanwhile, the appearance quality of the fiber-reinforced composite material was A.

Comparative Example 2

An epoxy resin composition, a cured epoxy resin, and a fiber-reinforced composite material were produced by the same methods as in Example 1 except that the resin composition was changed as presented in Table 3. In the present composition, the value of b/a was 0.15 to be small, and thus the Tg of the cured resin was 205° C. to be low. Meanwhile, the appearance quality of the fiber-reinforced composite material was A.

Comparative Example 3

An epoxy resin composition, a cured epoxy resin, and a fiber-reinforced composite material were produced by the same methods as in Example 1 except that the resin composition was changed as presented in Table 3. In the present composition, the value of b/a was 0.65 to be great, and thus the Tg of the cured resin was 211° C. to be low. Meanwhile, the appearance quality of the fiber-reinforced composite material was A.

Comparative Example 4

An epoxy resin composition, a cured epoxy resin, and a fiber-reinforced composite material were produced by the same methods as in Example 1 except that the resin composition was changed as presented in Table 3. In the present composition, the constituent [B] was not contained but 1.0 part of 3-(3,4-dichlorophenyl)-1,1-dimethylurea was used instead of the constituent [B], thus the Tg of the cured resin was 229° C. to be high, but resin withering and disturbance of fiber orientation were observed on the surface of the fiber-reinforced composite material, and the appearance quality was C.

Comparative Example 5

An epoxy resin composition, a cured epoxy resin, and a fiber-reinforced composite material were produced by the same methods as in Example 1 except that the resin composition was changed as presented in Table 3. In the present composition, the constituent [B] was not contained but 3.0 parts of 3-(3,4-dichlorophenyl)-1,1-dimethylurea was used instead of the constituent [B], and thus the Tg of the cured resin was 215° C. to be slightly low. In addition, resin withering was slightly observed on the surface of the fiber-reinforced composite material at a level having no problem, and the appearance quality was B.

Comparative Example 6

An epoxy resin composition, a cured epoxy resin, and a fiber-reinforced composite material were produced by the same methods as in Example 1 except that the resin composition was changed as presented in Table 3. In the present composition, the constituent [B] was not contained but 5.0 parts of 3-(3,4-dichlorophenyl)-1,1-dimethylurea was used instead of the constituent [B], and thus the Tg of the cured resin was 203° C. to be low. Meanwhile, the appearance quality of the fiber-reinforced composite material was A.

Comparative Example 7

An epoxy resin composition, a cured epoxy resin, and a fiber-reinforced composite material were produced by the same methods as in Example 1 except that the resin composition was changed as presented in Table 3. In the present composition, the value of c/a was 0.001 to be small, thus the Tg of the cured resin was 215° C. to be slightly low, resin withering and disturbance of fiber orientation were observed on the surface of the fiber-reinforced composite material, and the appearance quality was C.

Comparative Example 8

An epoxy resin composition, a cured epoxy resin, and a fiber-reinforced composite material were produced by the same methods as in Example 1 except that the resin composition was changed as presented in Table 3. In the present composition, the value of c/a was 0.021 to be great, thus the Tg of the cured resin was 214° C. to be slightly low, a number of pits were observed on the surface of the fiber-reinforced composite material, and the appearance quality was C.

Comparative Example 9

An epoxy resin composition, a cured epoxy resin, and a fiber-reinforced composite material were produced by the same methods as in Example 1 except that the resin composition was changed as presented in Table 3. In the present composition, the value of c/a was 0.017 to be great, thus the Tg of the cured resin was 217° C. to be slightly low, a number of pits were observed on the surface of the fiber-reinforced composite material, and the appearance quality was C.

TABLE 1

| | Constituent | | Example 1 | Example 2 | Example 3 | Example 4 |
|---|---|---|---|---|---|---|
| Epoxy resin composition (parts by mass) | [A] a tri- or higher functional epoxy resin [A1] | "SUMI-EPOXY ®" ELM434 | 100 | 80 | 70 | 90 |
| | | "jER ®" 1031S | | | | 10 |
| | Epoxy resins other than [A] | "jER ®" 828 | | | 20 | 30 |
| | [B] an aromatic amine | "SEIKACURE ®"-S | 20.7 | 19.2 | 18.4 | 19.8 |
| | [C] an imidazole compound [C1] | "CUREZOL ®" 2P4MHZ | 1.0 | 1.0 | 1.0 | 1.0 |
| | | "CUREZOL ®" P-0505 | | | | |
| | Thermoplastic resin | "SUMIKA EXCEL ®" PES 5003P | 5.0 | 5.0 | 5.0 | |
| Resin composition parameter | Value of a | | 0.658 | 0.617 | 0.596 | 0.662 |
| | Value of b | | 0.263 | 0.247 | 0.239 | 0.265 |
| | Value of c | | 0.0042 | 0.0042 | 0.0043 | 0.0044 |
| | Value of b/a | | 0.40 | 0.40 | 0.40 | 0.40 |
| | Value of c/a | | 0.006 | 0.007 | 0.007 | 0.007 |
| Evaluation results | Minimum viscosity of epoxy resin composition/Pa · s | | 1.0 | 0.9 | 0.9 | 1.4 |
| | Glass transition temperature of cured epoxy resin/° C. | | 232 | 229 | 225 | 238 |
| | Appearance quality of fiber-reinforced composite material | | A | A | A | A |

| | Constituent | | Example 5 | Example 6 | Example 7 | Example 8 |
|---|---|---|---|---|---|---|
| Epoxy resin composition (parts by mass) | [A] a tri- or higher functional epoxy resin [A1] | "SUMI-EPOXY ®" ELM434 | 50 | 40 | 60 | 60 |
| | | "jER ®" 1031S | 50 | 60 | 40 | 30 |
| | Epoxy resins other than [A] | "jER ®" 828 | | | | 10 |
| | [B] an aromatic amine | "SEIKACURE ®"-S | 16.5 | 15.7 | 17.4 | 17.4 |
| | [C] an imidazole compound [C1] | "CUREZOL ®" 2P4MHZ | 1.0 | 1.0 | | |
| | | "CUREZOL ®" P-0505 | | | 1.0 | 1.0 |
| | Thermoplastic resin | "SUMIKA EXCEL ®" PES 5003P | | | | |
| Resin composition parameter | Value of a | | 0.567 | 0.543 | 0.591 | 0.594 |
| | Value of b | | 0.227 | 0.217 | 0.237 | 0.237 |
| | Value of c | | 0.0045 | 0.0046 | 0.0030 | 0.0030 |
| | Value of b/a | | 0.40 | 0.40 | 0.40 | 0.40 |
| | Value of c/a | | 0.008 | 0.008 | 0.005 | 0.005 |
| Evaluation results | Minimum viscosity of epoxy resin composition/Pa · s | | 3.2 | 3.6 | 2.7 | 2.2 |
| | Glass transition temperature of cured epoxy resin/° C. | | 261 | 270 | 262 | 252 |
| | Appearance quality of fiber-reinforced composite material | | A | B | A | A |

TABLE 2

| | Constituent | | Example 9 | Example 10 | Example 11 | Example 12 |
|---|---|---|---|---|---|---|
| Epoxy resin composition (parts by mass) | [A] a tri- or higher functional epoxy resin | "SUMI-EPOXY ®" ELM434 | 100 | 100 | 100 | 100 |
| | [B] an aromatic amine | "SEIKACURE ®"-S | 12.9 | 16.5 | 20.7 | 24.8 |
| | [C] an imidazole compound [C1] | "CUREZOL ®" P-0505 | 1.0 | 1.0 | 1.0 | 1.0 |
| | Thermoplastic resin | "SUMIKA EXCEL ®" PES 5003P | 5.0 | 5.0 | 5.0 | 5.0 |
| Resin composition parameter | Value of a | | 0.701 | 0.680 | 0.658 | 0.637 |
| | Value of b | | 0.175 | 0.218 | 0.263 | 0.306 |
| | Value of c | | 0.0030 | 0.0029 | 0.0028 | 0.0027 |
| | Value of b/a | | 0.25 | 0.32 | 0.40 | 0.48 |
| | Value of c/a | | 0.004 | 0.004 | 0.004 | 0.004 |
| Evaluation results | Minimum viscosity of epoxy resin composition/Pa · s | | 1.4 | 1.5 | 1.5 | 1.5 |
| | Glass transition temperature of cured epoxy resin/° C. | | 227 | 234 | 238 | 236 |
| | Appearance quality of fiber-reinforced composite material | | A | A | A | A |

| | Constituent | | Example 13 | Example 14 | Example 15 |
|---|---|---|---|---|---|
| Epoxy resin composition (parts by mass) | [A] a tri- or higher functional epoxy resin | "SUMI-EPOXY ®" ELM434 | 100 | 100 | 100 |
| | [B] an aromatic amine | "SEIKACURE ®"-S | 28.4 | 20.7 | 20.7 |
| | [C] an imidazole compound [C1] | "CUREZOL ®" P-0505 | 1.0 | 0.6 | 3.0 |
| | Thermoplastic resin | "SUMIKA EXCEL ®" PES 5003P | 5.0 | 5.0 | 5.0 |
| Resin composition parameter | Value of a | | 0.620 | 0.660 | 0.648 |
| | Value of b | | 0.341 | 0.264 | 0.259 |
| | Value of c | | 0.0027 | 0.0017 | 0.0083 |
| | Value of b/a | | 0.55 | 0.40 | 0.40 |
| | Value of c/a | | 0.004 | 0.003 | 0.013 |
| Evaluation results | Minimum viscosity of epoxy resin composition/Pa · s | | 1.6 | 1.0 | 2.4 |
| | Glass transition temperature of cured epoxy resin/° C. | | 230 | 226 | 227 |
| | Appearance quality of fiber-reinforced composite material | | A | B | B |

TABLE 3-1

| | Constituent | | Comparative Example 1 | Comparative Example 2 | Comparative Example 3 | Comparative Example 4 | Comparative Example 5 |
|---|---|---|---|---|---|---|---|
| Epoxy resin composition (parts by mass) | [A] a tri- or higher functional epoxy resin | "SUMI-EPOXY ®" ELM434 | 100 | 100 | 100 | 100 | 100 |
| | | "SUMI-EPOXY ®" ELM100 | | | | | |
| | | "jER ®" 1032H60 | | | | | |
| | [B] an aromatic amine | "SEIKACURE ®"-S | | 7.8 | 33.6 | 20.7 | 20.7 |
| | [C] an imidazole compound [C1] | "NOVACURE ®" HX3722 | | | | | |
| | | "CUREZOL ®" P-0505 | 1.0 | 1.0 | 1.0 | | |
| | Curing agent other than [B] and [C] | "jER Cure ®" DICY7 | 7.0 | | | | |
| | | DCMU99 | | | | 1.0 | 3.0 |
| | Thermoplastic resin | "SUMIKA EXCEL ®" PES 5003P | 5.0 | 5.0 | 5.0 | 5.0 | 5.0 |
| Resin composition parameter | Value of a | | 0.737 | 0.733 | 0.597 | 0.658 | 0.648 |
| | Value of b | | 0.000 | 0.110 | 0.388 | 0.263 | 0.259 |
| | Value of c | | 0.0032 | 0.0031 | 0.0026 | 0.0000 | 0.0000 |
| | Value of b/a | | 0.00 | 0.15 | 0.65 | 0.40 | 0.40 |
| | Value of c/a | | 0.004 | 0.004 | 0.004 | 0.000 | 0.000 |
| Evaluation results | Minimum viscosity of epoxy resin composition/Pa · s | | 2.0 | 1.3 | 1.7 | 0.7 | 1.5 |
| | Glass transition temperature of cured epoxy resin/° C. | | 207 | 205 | 211 | 229 | 215 |
| | Appearance quality of fiber-reinforced composite material | | A | A | A | C | B |
| Epoxy resin composition (parts by mass) | [A] a tri- or higher functional epoxy resin | "SUMI-EPOXY ®" ELM434 | 100 | 100 | 100 | 100 | 10.0 |
| | | "SUMI-EPOXY ®" ELM100 | | | | | |
| | | "jER ®" 1032H60 | | | | | |
| | [B] an aromatic amine | "SEIKACURE ®"-S | | 7.8 | 33.6 | 20.7 | 20.7 |
| | [C] an imidazole compound [C1] | "NOVACURE ®" HX3722 | | | | | |
| | | "CUREZOL ®" P-0505 | 1.0 | 1.0 | 1.0 | | |
| | Curing agent other than [B] and [C] | "jER Cure ®" DICY7 | 7.0 | | | | |
| | | DCMU99 | | | | 1.0 | 3.0 |
| | Thermoplastic resin | "SUMIKA EXCEL ®" PES 5003P | 5.0 | 5.0 | 5.0 | 5.0 | 5.0 |
| Resin composition parameter | Value of a | | 0.737 | 0.733 | 0.597 | 0.658 | 0.648 |
| | Value of b | | 0.000 | 0.110 | 0.388 | 0.263 | 0.259 |
| | Value of c | | 0.0032 | 0.0031 | 0.0026 | 0.0000 | 0.0000 |
| | Value of b/a | | 0.00 | 0.15 | 0.65 | 0.40 | 0.40 |
| | Value of c/a | | 0.004 | 0.004 | 0.004 | 0.000 | 0.000 |
| Evaluation results | Minimum viscosity of epoxy resin composition/Pa · s | | 2.0 | 1.3 | 1.7 | 0.7 | 1.5 |
| | Glass transition temperature of cured epoxy resin/° C. | | 207 | 205 | 211 | 229 | 215 |
| | Appearance quality of fiber-reinforced composite material | | A | A | A | C | B |

TABLE 3-2

| | Constituent | | Comparative Example 6 | Comparative Example 7 | Comparative Example 8 | Comparative Example 9 |
|---|---|---|---|---|---|---|
| Epoxy resin composition (parts by mass) | [A] a tri- or higher functional epoxy resin | "SUMI-EPOXY ®" ELM434 | 100 | 100 | 100 | 40 |
| | | "SUMI-EPOXY ®" ELM100 | | | | 40 |
| | | "jER ®" 1032H60 | | | | 20 |
| | [B] an aromatic amine | "SEIKACURE ®"-S | 20.7 | 20.7 | 20.7 | 20.5 |
| | [C] an imidazole compound [C1] | "NOVACURE ®" HX3722 | | | | 10.0 |
| | | "CUREZOL ®" P-0505 | | 0.3 | 5.0 | |
| | Curing agent other than [B] and [C] | "jER Cure ®" DICY7 | | | | |
| | | DCMU99 | 5.0 | | | |
| | Thermoplastic resin | "SUMIKA EXCEL ®" PES 5003P | 5.0 | 5.0 | 5.0 | |
| Resin composition parameter | Value of a | | 0.638 | 0.662 | 0.638 | 0.633 |
| | Value of b | | 0.255 | 0.265 | 0.255 | 0.253 |
| | Value of c | | 0.0000 | 0.0009 | 0.0137 | 0.0106 |
| | Value of b/a | | 0.40 | 0.40 | 0.40 | 0.40 |
| | Value of c/a | | 0.000 | 0.001 | 0.021 | 0.017 |
| Evaluation results | Minimum viscosity of epoxy resin composition/Pa · s | | 2.2 | 0.7 | 3.8 | 3.6 |
| | Glass transition temperature of cured epoxy resin/° C. | | 203 | 215 | 214 | 217 |
| | Appearance quality of fiber-reinforced composite material | | A | C | C | C |

INDUSTRIAL APPLICABILITY

The epoxy resin composition of the present invention exhibits proper low-temperature curability and provides a cured resin exhibiting high heat resistance, and thus a fiber-reinforced composite material exhibiting appearance quality and high heat resistance can be obtained when this epoxy resin composition is used as a matrix resin.

The fiber-reinforced composite material of the present invention is preferably used in sports applications and industrial applications.

The invention claimed is:

1. An epoxy resin composition comprising constituents [A], [B], and [C] below, and satisfying conditions (i) and (ii):
   [A] a tri- or higher functional epoxy resin;
   [B] an aromatic amine;
   [C] a reaction product of an imidazole compound and a bisphenol epoxy resin;

$0.20 \leq b/a \leq 0.60$; and (i)

$0.004 \leq c/a \leq 0.010$; (ii)

wherein a denotes a number of moles of epoxy groups in 100 g of the epoxy resin composition, b denotes a number of moles of active hydrogens contained in the constituent [B], and c denotes a number of moles of imidazole rings contained in the constituent [C].

2. The epoxy resin composition according to claim 1, wherein the constituent [A] is contained in an amount of 60 to 100 parts by mass in 100 parts by mass of all epoxy resins.

3. The epoxy resin composition according to claim 1, wherein [A1] a tetrakis(hydroxyphenyl)ethane epoxy resin is contained as the constituent [A].

4. The epoxy resin composition according to claim 3, wherein the constituent [A1] is contained in an amount of 10 to 50 parts by mass in 100 parts by mass of all epoxy resins.

5. The epoxy resin composition according to claim 1, wherein a glass transition temperature of a cured resin produced by subjecting the epoxy resin composition to primary curing at 180° C. for 30 minutes and then to secondary curing at 240° C. for 30 minutes is 220° C. or more.

6. A prepreg comprising the epoxy resin composition according to claim 1 and a reinforced fiber.

7. A fiber-reinforced composite material comprising the prepreg according to claim 6 in cured form.

8. A method for producing a fiber-reinforced composite material, comprising subjecting the prepreg according to claim 6 to primary curing at 130° C. to 200° C. and then to secondary curing at 210° C. to 270° C. for 10 minutes or more.

9. An epoxy resin composition comprising constituents [A], [B], and [C] below, and satisfying conditions (iii) and (iv):
   [A] a tri- or higher functional epoxy resin;
   [B] an aromatic amine;
   [C] a reaction product of an imidazole compound and a bisphenol epoxy resin, wherein the reaction product is an adduct of bisphenol A diglycidyl ether and imidazole;

$0.20 \leq b/a \leq 0.60$; and (iii)

$0.002 \leq c/a \leq 0.010$; (iv)

wherein a denotes a number of moles of epoxy groups in 100 g of the epoxy resin composition, b denotes a number of moles of active hydrogens contained in the constituent [B], and c denotes a number of moles of imidazole rings contained in the constituent [C].

10. A prepreg comprising the epoxy resin composition according to claim 9 and a reinforced fiber.

* * * * *

UNITED STATES PATENT AND TRADEMARK OFFICE
CERTIFICATE OF CORRECTION

Page 1 of 1

PATENT NO. : 11,186,674 B2
APPLICATION NO. : 16/611351
DATED : November 30, 2021
INVENTOR(S) : Kentaro Sano et al.

It is certified that error appears in the above-identified patent and that said Letters Patent is hereby corrected as shown below:

On the Title Page

Item (57), Line 2, under ABSTRACT, "high heat resistance and excellent appearance quality. is the" should read -- high heat resistance and excellent appearance quality. The --

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*